United States Patent [19]
Kobayashi et al.

[11] Patent Number: 5,539,666
[45] Date of Patent: Jul. 23, 1996

[54] DATA COMMUNICATIONS METHOD AND SYSTEM COUPLING DEVICE

[75] Inventors: Yoshinao Kobayashi, Hiratsuka; Hironao Sone, Yokohama; Hiroshi Ishikawa, Shizuoka, all of Japan

[73] Assignee: International Business Machines Corporation, Armonk, N.Y.

[21] Appl. No.: 336,153

[22] Filed: Nov. 8, 1994

[30] Foreign Application Priority Data

Dec. 17, 1993 [JP] Japan ..................................... 5-318535

[51] Int. Cl.$^6$ ................................................. G06F 17/02
[52] U.S. Cl. ......................................................... 364/514 R
[58] Field of Search ....................... 364/514 R; 395/200; 375/338; 370/79, 82, 83, 84, 85.11, 85.12

[56] References Cited

U.S. PATENT DOCUMENTS 5,218,680  6/1993  Farrell et al. ....................... 364/DIG. 1

OTHER PUBLICATIONS

Davies et al; "Computer Networks and Their Protocols"; John Wiley & Sons (New York) 1980.

*Primary Examiner*—Ellis B. Ramirez
*Attorney, Agent, or Firm*—Joscelyn G. Cockburn

[57] ABSTRACT

To smoothly transmit a plurality of types of data with different priorities via the same signal transmission path. Four-bit data showing the state of a bus are converted into six-bit data between a personal computer and an extension box connected by two optical-fiber links in accordance with a predetermined code system in a normal state, and the converted six-bit data are superimposed on a packet by using a field consisting of six bits as a single unit and serially and sequentially transmitted in order to transfer the state of the bus. When bus arbitration is performed by one system and an ARB level is determined, an interrupt start code not defined by the predetermined code system is prefixed to ARB-level data and an interrupt cancellation code not defined by the code system is suffixed to ARB-level data so that data can be transmitted by asynchronously interrupting packet transmission. Thereby, the ARB level determined by the primary-side system is instantaneously transferred to the secondary-side system.

10 Claims, 7 Drawing Sheets

DATA COMMUNICATIONS METHOD AND SYSTEM COUPLING DEVICE

FIELD OF THE INVENTION

The present invention relates to a data communication method and a system coupling device, and, more particularly, to a data communication method preferably used for serial communication wherein a bus of a computer system is coupled to a bus of an extension box or a bus of another computer system via a signal transmission path and to a system coupling device to which the data communication method can be applied.

PRIOR ART

A personal computer has a slot for extending its functions and, therefore, various types of new function can be added by connecting an extension box or the like provided with a card or the like to the slot. For connection to the extension box or the like, all the signal lines of a bus have hitherto been extended through a slot so that they can be connected to the signal lines of a bus attached to the extension box.

However, this involves various problems, because both the number of signal lines constituting a bus and the speed of signals passing along each signal line have greatly increased as personal computer processing speeds have improved and functions have been upgraded.

Therefore, a system is proposed that decreases the information content to be transferred between a personal computer and an extension box by ignoring some of the signals passing along the bus of the personal computer and that of the extension box, and then converting the remaining signals into another form such as a packet for mutual communication. It is thereby possible to realize functions almost identical with those available when the signal lines of the bus of the personal computer are connected with those of the bus of the extension box, and also to decrease the number of signal lines used to connect the bus of the personal computer with that of the extension box.

However, if the bus of the personal computer is extended by connecting it to a bus of an external system such as an extension box or the like, it is also necessary to arbitrate bus contention between the personal computer and the external system, because the card or the like in the extension box may also request the use of the buses. Arbitration must be performed within a very short time. For example, it is specified in the Microchannel® Bus standard that arbitration of bus contention must be terminated within 600 ns.

Therefore, for the above bus extension, a signal transmission path for serially transmitting the above packet and a separate high-speed exclusive signal transmission path have hitherto been formed between a personal computer and an external system in order to transmit data signals for processing events generated at random (asynchronously) such as data signals relating to the arbitration of bus contention or direct memory access (DMA) and for which a high-speed response via the exclusive signal transmission path is required.

In recent years, there has been increasing pressure to decrease the cost of information processing equipment such as personal computers and to minimize the cost of extending equipment functions. However, the above-mentioned method is unsatisfactory in this respect because it is necessary to establish an exclusive signal transmission path that is less frequently used, in addition to a normally used signal transmission path, between the personal computer and the external system, and the exclusive signal transmission path does not decrease the cost. To increase the communication speed, it is effective to establish a signal transmission path with optical-fiber links. However, there is a problem in that the cost greatly increases with the number of signal transmission paths because a photoelectric transfer unit must be established to correspond to each optical-fiber link.

SUMMARY OF THE INVENTION

The present invention takes account of the above problem. Its primary object is to provide a data communication method for smoothly transmitting various types of data with different priorities via the same signal transmission path.

Another object of the present invention is to provide a system coupling device for coupling a plurality of systems at low cost.

To achieve the above objects, the data communication method according to the invention transmits serially data from one to the other of a pair of systems connected via a signal transmission path. The method comprises the steps of converting data of the first kind that are to be transmitted from one to the other of the systems in accordance with a predetermined code system; sequentially transmitting the converted data of the first kind via the signal transmission path; and transmitting an interrupt code not defined by the code system, and data of the second kind with higher priority than the converted data of the first kind, via the signal transmission path by asynchronously interrupting transmission of the converted data of the first kind as needed in order to transmit data of the second kind during transmission of the converted data of the first kind.

The system coupling device, according to the invention, is connected to both of a pair of systems in order to couple said systems and comprises a signal transmission path; a first transmission means, which is connected to one end of the signal transmission path, converts data of the first kind that are to be transmitted in accordance with a predetermined code system, and sequentially transmits the converted data of the first kind via the signal transmission path. A second transmission means, which is connected to one end of the signal transmission path and transmits an interrupt code not defined by the code system and data of the second kind with higher priority than data of the first kind by asynchronously interrupting transmission performed by the first transmission means as needed in order to transmit data of the second kind during transmission of the data of the first kind by the first transmission means; and a processing means, which is connected to the other end of the signal transmission path, extracts data of the second kind transmitted together with an interrupt code via the signal transmission path in order to perform processing in accordance with data of the second kind when the interrupt code is included in the data received via the signal transmission path, and inverts data corresponding to data of the first kind converted by the first transmission means in the received data into data of the first kind in order to perform processing in accordance with the inverted data of the first kind.

It is possible to configure the system coupling device so that the first transmission means is connected to a first bus attached to one of a pair of systems in order to transmit data showing the state of the first bus and the second transmission means is connected to a second bus attached to the other of the systems in order to change the states of the second bus in accordance to whether the data are of the first or second kind.

BRIEF DESCRIPTION OF THE DRAWINGS

Figures, consisting of FIGS. 3A and 3B, is schematic block diagrams of an OSMC controller.

DESCRIPTION OF SYMBOLS

10: Computer system
12: Personal computer
14: Extension box
16: Optical-fiber assembly
18: Microchannel bus
30: Packet data processing section
32: Non-packet data processing section
34: Transmitting/receiving section
46: Interrupt sequencer
58: Interrupt detection section

PREFERRED EMBODIMENT

Figure 1:
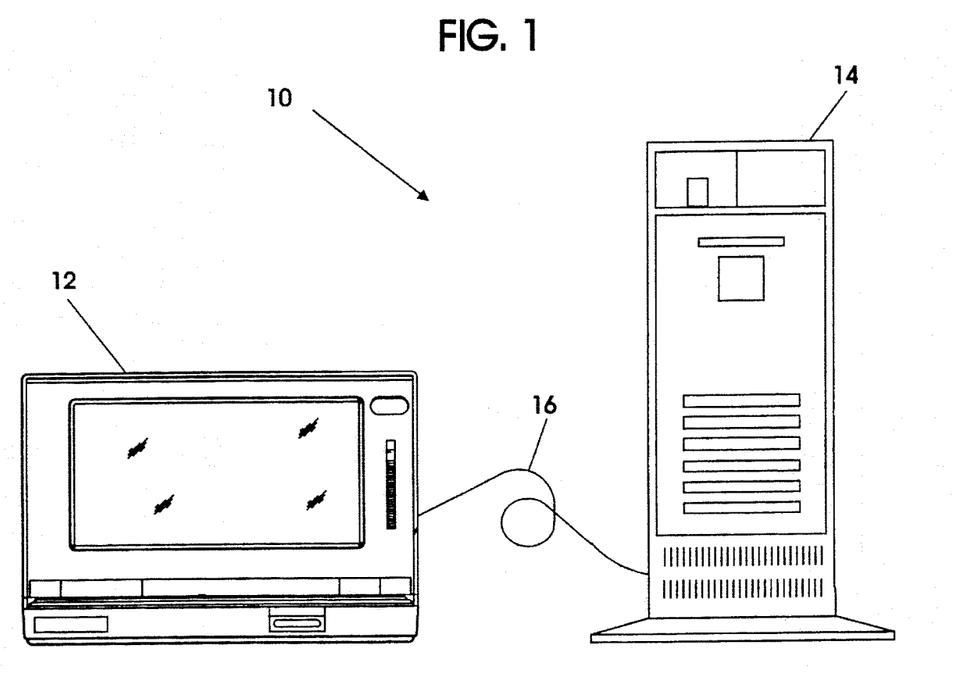
FIG. 1 is a external view of the computer system of this embodiment.

An embodiment of the present invention is described below in detail with reference to accompanying drawings. FIG. 1 shows a computer system 10 to which the present invention can be applied. The computer system 10 comprises a notebook personal computer 12, an extension box 14, and an optical-fiber assembly 16 for connecting the computer 12 with the box 14.

Figure 2:
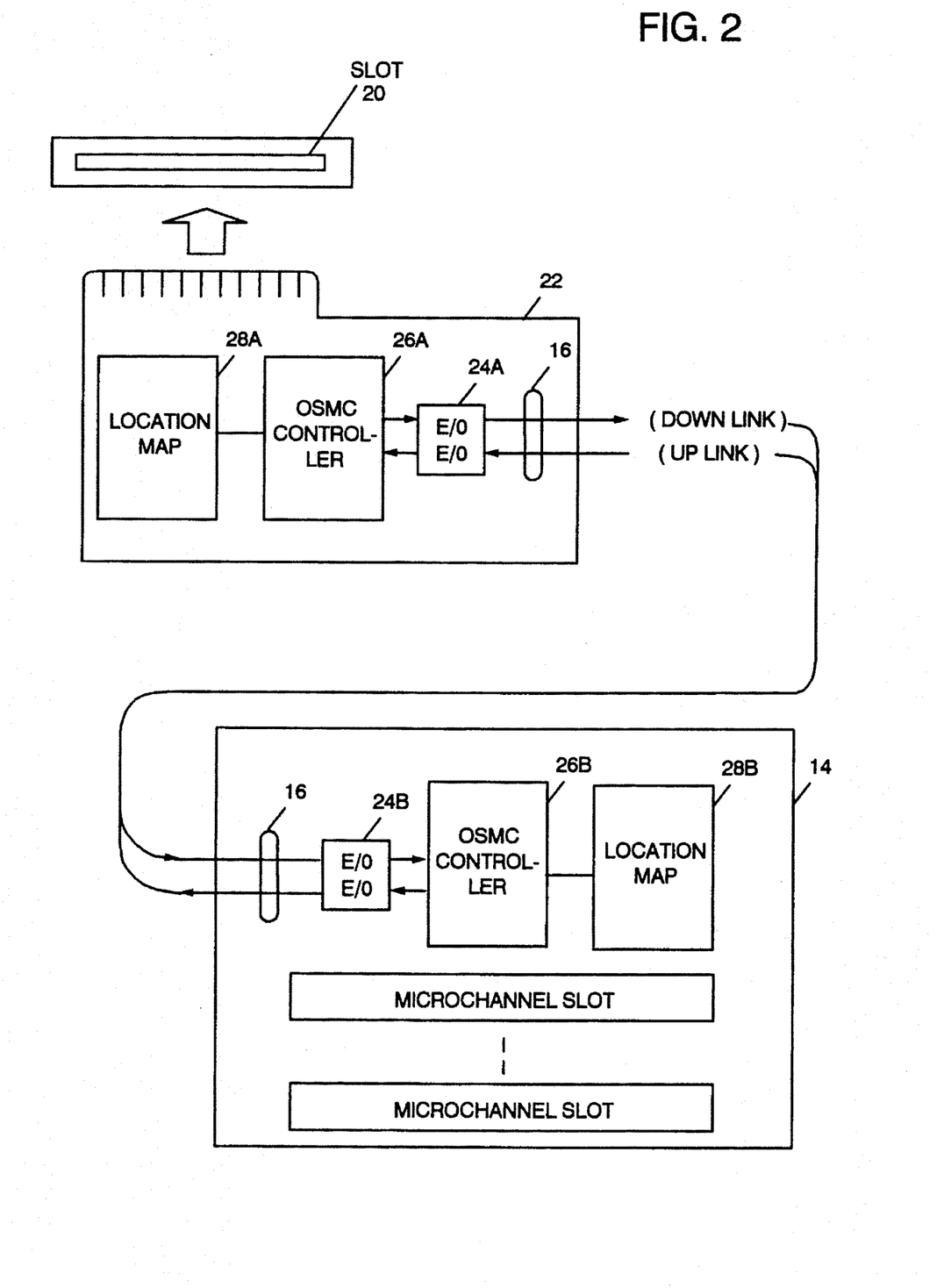
FIG. 2 is a schematic block diagram of the OSMC card and extension box to be installed on a personal computer.
Figures 3, 3B:
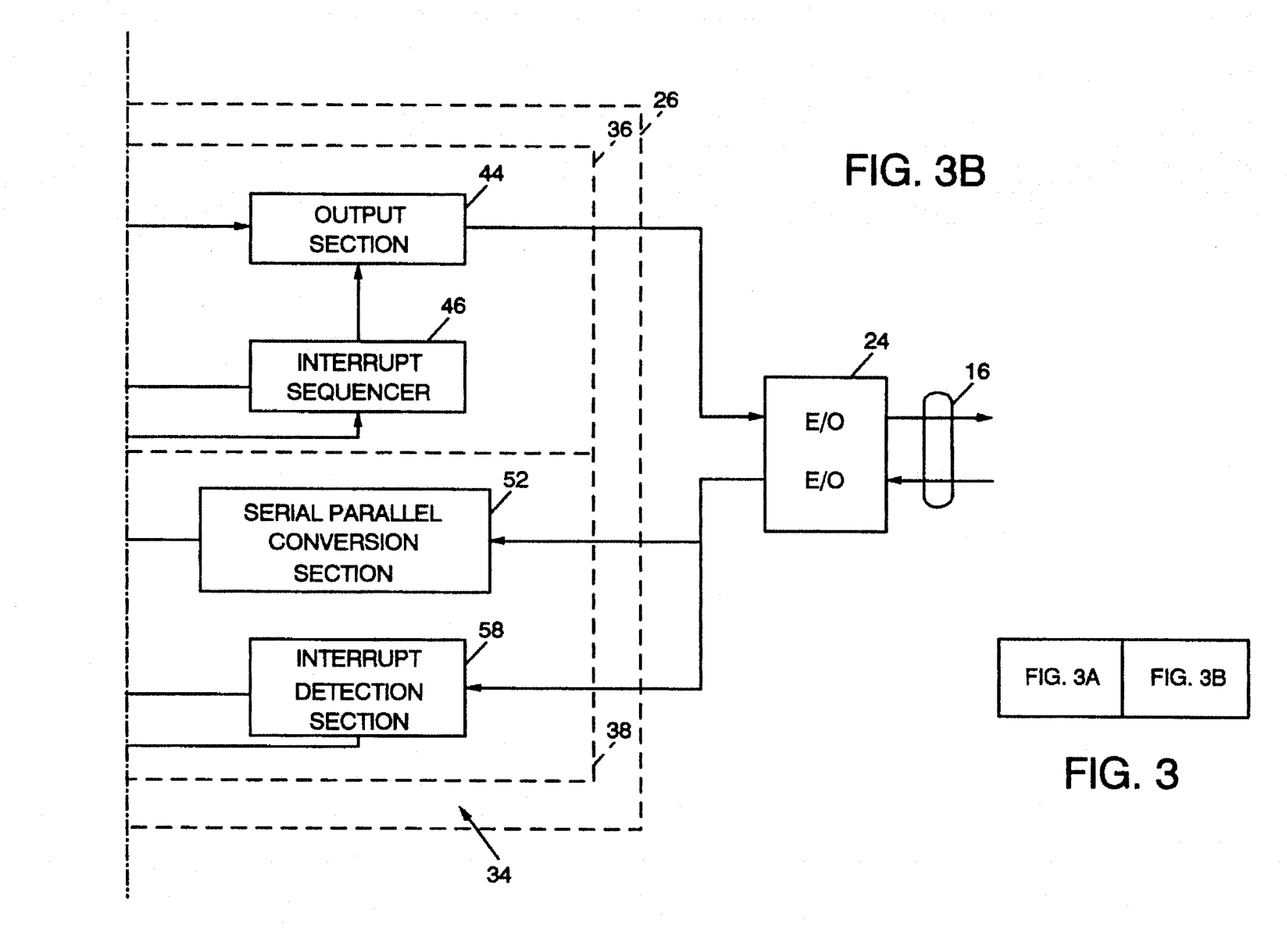
Figure 3A:
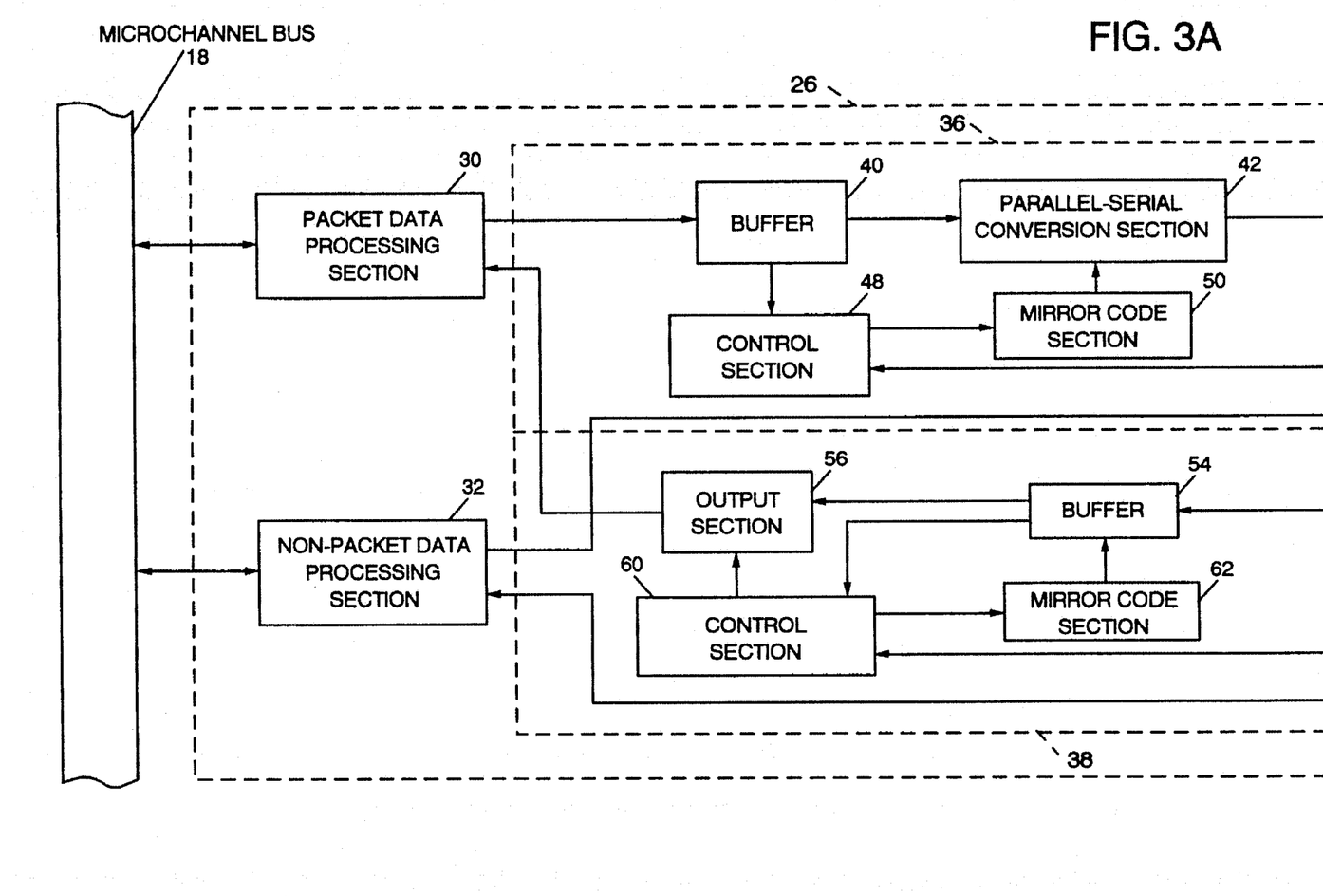

The personal computer 12 is provided with a bus 18 conforming to the Microchannel Bus standard (shown in FIG. 3, which is hereafter referred to as a microchannel bus 18) as an example. As shown in FIG. 2, the personal computer 12 is also provided with an extension slot 20, which has an optical serial microchannel card (hereafter referred to as an OSMC card) 22. The OSMC card 22 has a location map 28A comprising a photoelectric transfer assembly 24A, an OSMC controller 26A, and SRAM. One end of the optical-fiber assembly 16 is connected to the photoelectric transfer assembly 24A on the OSMC card 22.

The extension box 14 is also provided with a microchannel bus (not shown) and moreover provided with a slot (shown in FIG. 2) conforming to the Microchannel Bus standard; this slot is connected to the above bus and on it are installed various cards, a standard SCSI slot (used for DASD), and serial and parallel ports. Moreover, the extension box 14 is also provided with a photoelectric transfer assembly 24B, an OSMC controller 263, and a location map 28B, which have almost the same constitution as the above photoelectric transfer assembly 24A, OSMC controller 26A, and location map 28A, respectively. The other end of the optical-fiber assembly 16 is connected to the photoelectric transfer assembly 24B of the extension box 14. The optical-fiber assembly 16 has an overall length of, for example, about 10 m, and comprises two optical-fiber links, namely, a down link for transmitting a signal from the personal computer 12 to the extension box 14, and an up link for transmitting a signal from the extension box 14 to the personal computer 12.

The following is a description of the constitutions of the OSMC controllers 26A and 26B. However, because these controllers have almost the same constitution, they are hereafter referred to as the OSMC controller 26. The side to be described is hereafter assumed to be the "primary side" and the opposite side is hereafter assumed to be the "secondary side."

First, the function of the OSMC controller 26 is briefly described below. Some signals of the microchannel bus 18 on the primary-side system are ignored by the OSMC controller 26 of the primary-side system, and the remaining signals are converted into other signals by the controller 26 and thereafter sent to the secondary-side system via the photoelectric transfer assembly 24 of the primary-side system. In response to signals sent to the secondary-side system by the microchannel bus, signals are sent back by the OSMC controller 26 of the secondary-side system. Some signals of the microchannel bus 18 of the secondary-side system are ignored by the OSMC controller 26 of the secondary-side system, and the remaining signals are converted into other signals by the controller 26 and thereafter sent to the primary-side system via the photoelectric transfer assembly 24 of the secondary-side system and sent back in response to signals of the microchannel bus by the OSMC controller 26 of the primary-side system.

As shown in FIG. 3, the OSMC controller 26 comprises a packet data processing section 30, a non-packet data processing section 32, and a transmitting/receiving section 34. The packet data processing section 30 and the non-packet data processing section 32 are each connected to a certain signal lines of the microchannel bus 18. The transmitting/receiving section 34 comprises a transmitting section 36 and a receiving section 38.

The transmitting section 36 comprises a buffer 40, a parallel-serial conversion section 42, an output section 44, an interrupt sequencer 46, a control section 48, and a mirror code section 50. The output end of the packet data processing section 30 is connected to the photoelectric transfer assembly 24 via the buffer 40, the parallel-serial conversion section 42, and the output section 44. The output end of the non-packet data processing section 32 is connected to the interrupt sequencer 46. The interrupt sequencer 46 is connected to the output section 44 and the control section 48. The control section 48 is connected to the buffer 40 and the mirror code section 50. The mirror code section 50 is connected to the parallel-serial conversion section 42.

The receiving section 38 comprises a serial-parallel conversion section 52, a buffer 54, an output section 56, an interrupt detection section 58, a control section 60, and a mirror code section 62. The output end of the photoelectric transfer assembly 24 is connected to both input ends of the serial-parallel conversion section 52 and to the interrupt detection section 58. The output end of the serial-parallel conversion section 52 is connected to the input end of the packet data processing section 30 via the buffer 54 and the output section 56. The output end of the interrupt detection section 58 is connected to both input ends of the control section 60 and to the non-packet data processing section 32, and the output end of the control section 60 is connected to both input ends of the output section 56 and to the mirror code section 62. The output end of the mirror code section 62 is connected to the buffer 54.

Figure 4:
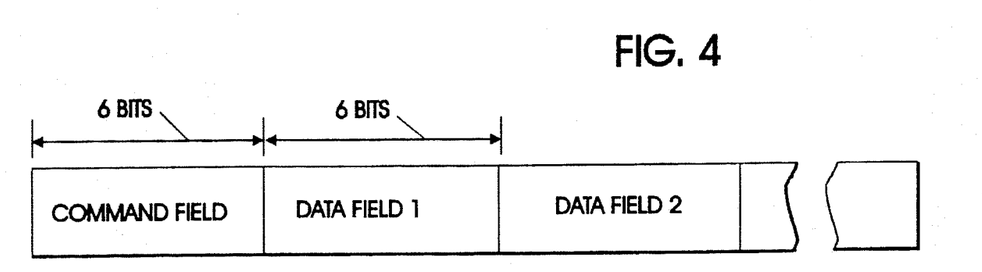
FIG. 4 is a conceptual view of a packet format.

The operations of the packet data processing section 30 are described below as the function of this embodiment. The packet data processing section 30 monitors the microchannel bus 18 of its own system and outputs various types of packet data to be transmitted to the secondary-side system via the transmitting section 36 of the transmitting/receiving section 34 in accordance with the state of the microchannel bus 18 (a state shown by a signal passing along the microchannel bus 18). For this embodiment, a packet is constituted by assuming that a field consisting of 6 bits forms one unit. As shown in FIG. 4, the top field of a packet is assumed to be a command field and data fields 0 to 5, corresponding to the types of command, are added to the command field.

To transmit data through a communication circuit, in general, it is desirable to keep the DC balance in the circuit by canceling the direct-current component (DC component) and the low-frequency component of a signal passing through the circuit. This makes it unnecessary to support the DC component and low-frequency component of the signal passing through the circuit, and the cost can be decreased. Therefore, to keep the DC balance in the circuit, it is necessary to set the ratio between bits "0" and "1" of serial data passing through the circuit to 1:1 or a value close to 1:1. Thus, for this embodiment, 4-bit data are converted into six-bit patterns (codes) respectively consisting of three "0" bits and three "1" bits, as shown in the following table by the packet data processing section 30, in accordance with a code system called 5B6B coding. The converted codes are written in each field of a packet.

TABLE 1

| Data to be converted | Converted data |
| --- | --- |
| $(0)_H$ | $(111000)_B$ |
| $(1)_H$ | $(110100)_B$ |
| $(2)_H$ | $(110010)_B$ |
| $(3)_H$ | $(110001)_B$ |
| $(4)_H$ | $(101100)_B$ |
| $(5)_H$ | $(101010)_B$ |
| $(6)_H$ | $(101001)_B$ |
| $(7)_H$ | $(100110)_B$ |
| $(8)_H$ | $(100101)_B$ |
| $(9)_H$ | $(100011)_B$ |
| $(A)_H$ | $(011100)_B$ |
| $(B)_H$ | $(011010)_B$ |
| $(C)_H$ | $(011001)_B$ |
| $(D)_H$ | $(010110)_B$ |
| $(E)_H$ | $(010101)_B$ |
| $(F)_H$ | $(010011)_B$ |

In Table 1 the symbol $(\ )_H$ indicates hexadecimal notation and $(\ )_B$ indicates binary notation. Any one of the 16 six-bit codes specified above is written in each field of the packet data output from the packet data processing section 30. In addition, there are four six-bit patterns respectively consisting of three "0" bits and three "1" bits, and these four types of six-bit patterns are used for mirror code, mentioned later. Each packet output from the packet data processing section 30 represents any one of a plurality of predetermined commands. The commands used for this embodiment are shown in Table 2.

TABLE 2

| Command | Contents |
| --- | --- |
| ACK | Positive acknowledgement to IRQ or MSC |
| NAK | Negative acknowledgement to IRQ |
| IRQ | Interrupt request (—CHCK, –IRQ) |
| MSC | CHRESET, —PREEMPT, or EOT |

TABLE 2-continued

| Command | Contents |
| --- | --- |
| BIW | Bus cycle lead out, I/O write |
| BIR | Bus cycle lead out, I/O read |
| BMW | Bus cycle lead out, memory write |
| BMR | Bus cycle lead out, memory read |
| NUL | Charging code (for synchronization) |
| DSC | Link error notice |
| SNC | Link initiation |
| BRACK | Response to BIW, BIRBMW, or BMR |

One (two for NUL) of the 16 types of six-bit codes specified in Table 1 above is preassigned to each of the above commands, and the packet-receiving sides discriminate between commands by referring to the code written in the command field. An address or set of transfer data is written in the data field.

A priority is preassigned to each of the above commands. Therefore, when a plurality of commands with different contents must be transmitted at the same time, the packet data processing section 30 sequentially outputs corresponding packet data in accordance with the priority of each command. When no packet need be transferred, the packet data processing section 30 outputs NUL command packet data. As mentioned above, there are two patterns corresponding to the NUL command. The packet data processing section 30 alternately outputs these two patterns. The NUL command packet is used to synchronize the primary- and secondary-side systems.

Packet data are output from the packet data processing section 30 every field (every six bits) and temporarily stored in the buffer 40 of the transmitting section 36. The buffer 40 is capable of storing data for a plurality of fields, and sequentially outputs stored data to the parallel-serial conversion section 42 whenever new data are input. The control section 48 determines whether four or more consecutive "0" or "1" bits are present (that is, whether the pattern $(0000)_2$ or $(1111)_2$ is present) in data for a plurality of fields stored in the buffer 40.

Although none of the 16 types of bit patterns shown in Table 1 has four or more consecutive bits of "0" or "1" bits, the pattern $(0000)_2$ or $(1111)_2$ may be generated over a boundary between two fields of a packet. In this case, one of the two fields covered by the pattern always contains a specific pattern corresponding to any one of $(0)_H$, $(1)_H$, $(2)_H$, and $(3)_H$ in Table 1, namely, $(111000)_B$, $(110100)_B$, $(110010)_B$, or $(110001)_B$. Therefore, when the control section 48 detects the pattern $(0000)_2$ or $(1111)_2$, it outputs an instruction to the mirror code section 50 to reverse the value of each bit of data in the field containing the specific pattern. When the instruction is input, the mirror code section 50 creates mirror code, which reverses bits of serial data output from the parallel-serial conversion section 42 in accordance with the specific pattern.

In this case, $(111000)_B$ is converted into $(000111)_B$, $(110100)_B$ into $(001011)_B$, $(110010)_B$ into $(001101)_B$, and $(110001)_B$ into $(001110)_B$, and are then output. Thereby, serial data transmitted through an optical-fiber link to the secondary-side system through the output section 44 and photoelectric transfer assembly 24 always keep the DC balance every six bits and do not include four or more consecutive "0" or "1" bits.

Packet data sent from the secondary-side system through optical-fiber links and the photoelectric transfer assembly 24 are converted into 6-bit parallel data by the serial-parallel conversion section 52 of the receiving section 38 and thereafter stored temporarily in the buffer 54. When the pattern of data stored in the buffer 54 coincides with a pattern mirror-reflected by the secondary-side system (that is, the above-mentioned $(000111)_B$, $(001011)_B$, $(001101)_B$, or $(001110)_B$), the control section 60 outputs to the mirror code section 62 an instruction for reversing the value of each bit. Thereby, data output from the buffer 54 are made equal to data output from the packet data processing section 30 of the secondary-side system, and are output as packet data received by the packet data processing section 30 through the output section 56.

The packet data processing section 30 inverts input packet data every field in accordance with Table 1, interprets a command by referring to a command field, and converts the command into a signal for the microchannel bus 18 as needed in order to output it to the microchannel bus 18.

Figure 5:
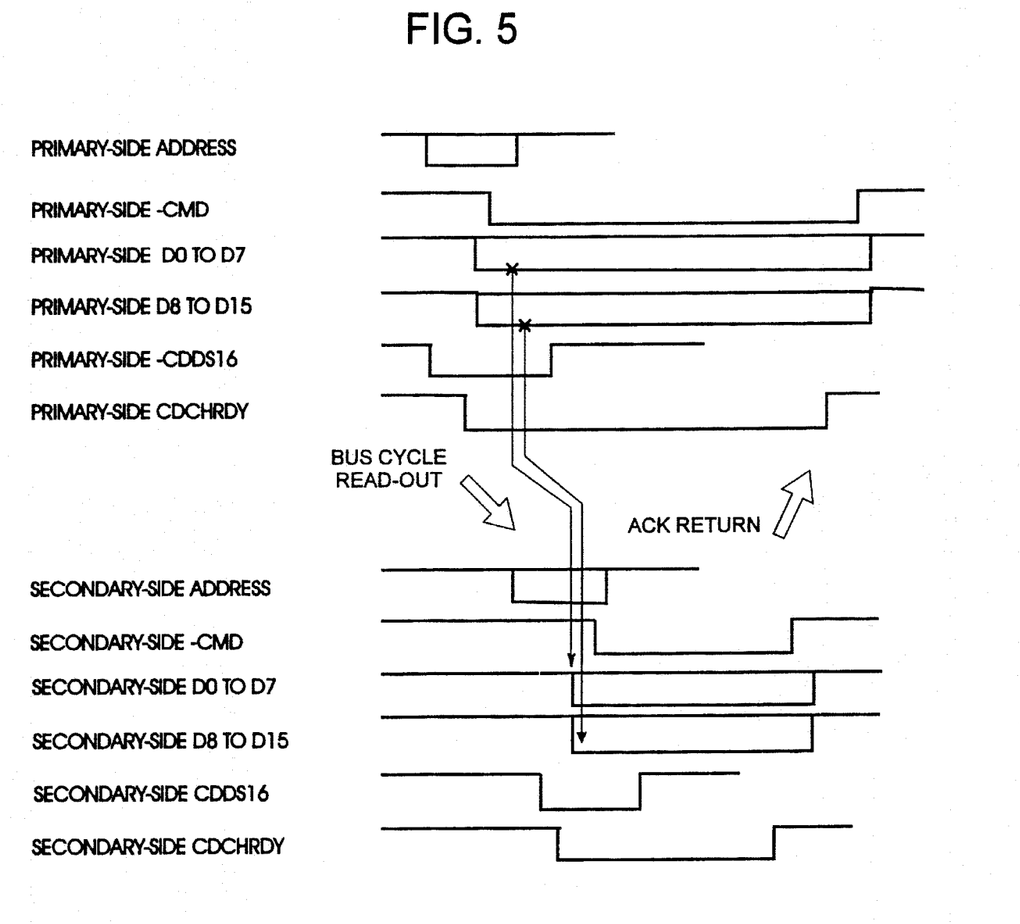
FIG. 5 is a timing chart for explaining the writing of 16-bit data to the secondary-side system.

The writing of 16-bit data in the secondary-side system is briefly described below, with reference to FIG. 5, as an example of the processing required for transferring packets between the packet data processing section 30 of the above primary-side system and the packet data processing section 30 of the secondary-side system. FIG. 5 shows changes in the levels of various signal lines of the microchannel buses 18 of the primary- and secondary-side systems in the write operation. The meanings of individual signal lines are given later.

A request for data writing is output from the primary-side system to the secondary-side system when address lines (including the line −ADL), the D0 to D15 lines (data lines), the −CMD line, and the −S0 or S1 line (not shown) are driven. Thereby, the packet data processing section 30 of the primary-side system transmits the data field of a packet to the secondary-side system as a bus cycle lead-out command (BIW or BMW command) to indicate the start of data writing, and waits for the bus cycles to terminate in the secondary-side system. When the packet data processing section 30 of the secondary-side system receives the above command, it regenerates bus cycles in the microchannel bus 18 of the secondary-side system.

That is, the section 30 drives address lines, the D0 to D15 lines, the −CMD line, and the −S0 or S1 line to write designated write data at a designated address. The packet data processing sections 30 of the primary-and secondary-side systems each have a cache memory (not shown) for storing an address, and each cache memory stores the same address. When an address in which data is written is close to the address stored in cache memory, only the offset value for the address stored in cache memory is reported. Only when a write address differs greatly from the address stored in cache memory is the write address reported to the secondary-side system. Thus, the amount of information to be transferred between the primary- and secondary-side systems decreases. When write processing terminates at the secondary-side system, a response packet is transmitted to the primary-side system. Thus, a series of bus cycles terminates.

Figure 6:
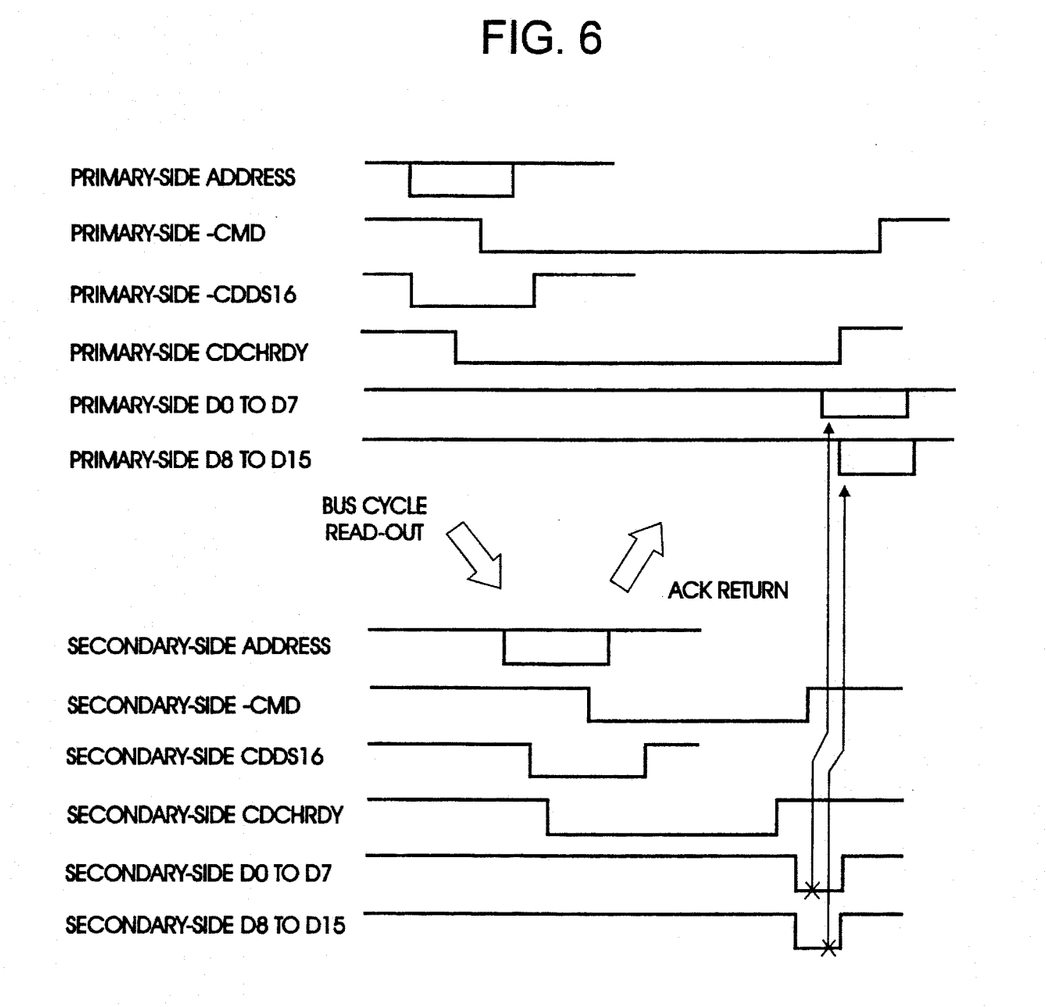
FIG. 6 is a timing chart for explaining the reading of 16-bit data from the secondary-side system.

FIG. 6 shows the reading of 16-bit data from the secondary-side system as another example. The reading of data from the primary-side system to the secondary-side system is requested when address lines, the −CMD line, and the −S0 or −S1 line (not shown in FIG. 6) are driven. Thereby, the packet data processing section 30 of the primary-side system transmits a packet of the bus cycle lead-out command (BIR command or BMR command) to indicate that data should be read to the secondary-side system, and waits for the bus cycles to terminate in the secondary-side system.

When the packet data processing section 30 of the secondary-side system receives the above command, it drives address lines, the −CMD line, and the −S0 or S1 line of the microchannel bus 18 of the secondary-side system to regenerate bus cycles, and thereafter transmits a temporary response packet to the primary-side system. Moreover, when data are actually read, the section 30 transmits read data by superimposing them on the packet. Thus, a series of bus cycles terminates.

In addition to the above, the packet data processing section 30 performs processing such as transfer of an interrupt level (IRQ command). Moreover, unless a bus cycle is generated, the packet data processing section 30 transmits a NUL command packet. The NUL command packet is used to synchronize the primary- and secondary-side systems.

Operations of the non-packet data processing section are described below. The non-packet data processing section 32 monitors a signal transmitted via a specific signal line of the microchannel bus 18, samples an instantaneous value of the signal as needed, and transmits the sample value by using the interrupt signal of the present invention. Specifically, a list is made of signal lines for transmitting a signal for which no timing delay is allowed, such as the ARB/−GNT line and the ARB1 to the ARB4 lines relating to the arbitration of contention in using the microchannel bus 18.

First, bus arbitration in the microchannel bus 18 is briefly described below. An arbitration control point (not shown but hereafter referred to as CACP) makes the ARB/−GNT line go high to perform bus arbitration. In the microchannel bus, a bus master for requesting a bus and a DMA slave (a peripheral unit that uses a DMA controller, not shown, to control DMA) are provided with a local arbiter. Each local arbiter is wired-OR-connected to the ARB1 to ARB4 lines of the microchannel bus.

Each local arbiter detects the start of arbitration when the ARB/−GNT line goes high, and outputs the priority of the bus master or the like (shown by 4-bit data) to the ARB1 to ARB4 lines of the microchannel bus when a bus request is output from the bus master connected to it. Then, each local arbiter compares the previously output bus master priority with the priorities of the ARB1 to ARB4 lines of the microchannel bus from a high-order bit (ARB3 line) in sequence, and stops outputting a priority if the output priority is lower.

Thus, the levels of the ARB1 to ARB4 lines of the microchannel bus change. Finally, the priority of the bus request source with the highest priority among the bus request sources, including bus masters and a DMA slave outputting bus requests, is generated in the ARB1 to ARB4 lines of the microchannel bus, the ARB/−GNT line is made to go low by the CACP, and a bus request source connected to a local arbiter outputting a signal surviving at the termination of arbitration obtains the right to use the bus.

However, the above-mentioned method is effective only in cases where every bus master or DMA slave outputting a bus request is directly connected to the microchannel bus. In this embodiment, because a bus master is present in the personal computer 12 and a DMA slave in the extension box 14, bus arbitration is done by the non-packet data processing section 32 in two stages. When the ARB/−GNT line goes high, the non-packet data processing section 32 detects that bus arbitration has started and waits until bus arbitration terminates and the ARB/−GNT line goes low. When the ARB/−GNT line goes low, the section 32 samples the level of the ARB1 to ARB4 lines at that time (the priority of a bus request source obtaining the right to use the bus, hereafter referred to as the ARB level) and outputs the level to the interrupt sequencer 46 of the transmitting section 36 as 4-bit ARB-level data.

When the interrupt sequencer 46 receives ARB-level data from the non-packet data processing section 32, it converts ARB-level data into 6-bit data in accordance with the code system shown in Table 1, adds a predetermined interrupt start code ((0000)$_B$ for this embodiment) before the converted data and a predetermined interrupt cancellation code ((1111)$_B$ for this embodiment) after the converted data, outputs data to the output section 44 as interrupt data, and notifies the control section 48 that interrupt data have been output. When the output section 44 receives the interrupt data from the interrupt sequencer 46, it preferentially outputs interrupt data to the photoelectric transfer assembly 24. Thereby, ARB-level data obtained at the primary-side system as the result of bus arbitration are transmitted to the secondary-side system.

Figure 7A:
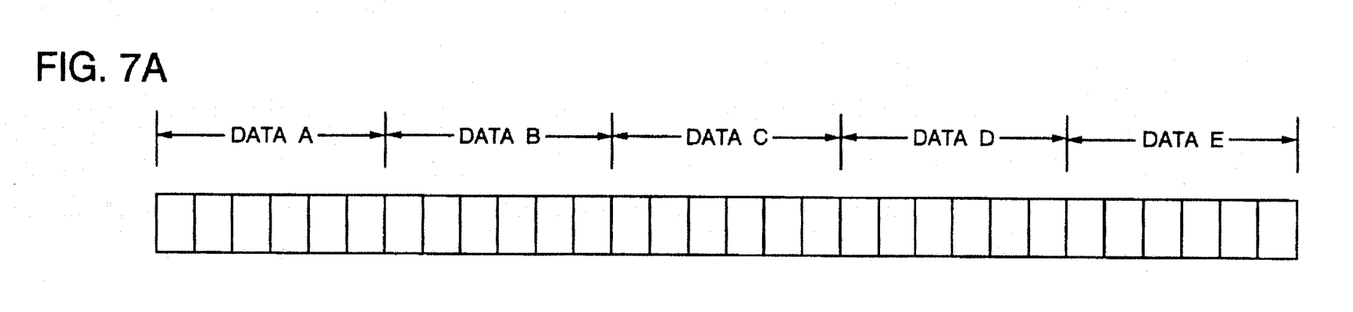
FIGS. 7(A) and 7(C) are conceptual views of data output from a transmitting section when no interrupt occurs and FIG. 7(B) is a conceptual view of data output from the transmitting section when an interrupt occurs.

FIG. 7A shows packet data output from output section 44 (FIG. 3) when no interrupt occurs.

Figure 7B:
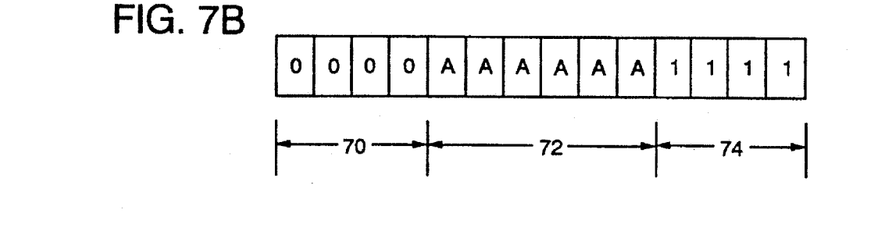
Figure 7C:
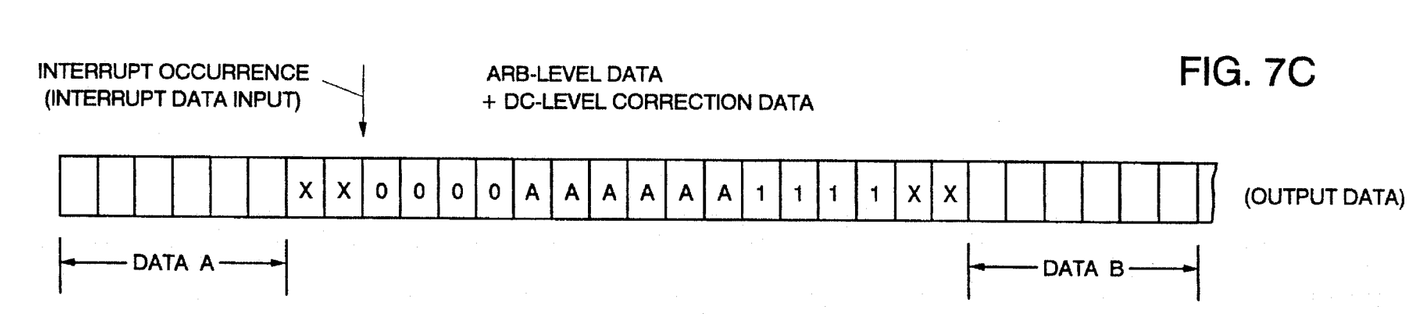

Because interrupt data are input to the output section 44 (FIG. 3) asynchronously with the transmission of packets from the transmitting section 36, the packet currently being transmitted is broken in the middle of a field, as shown in FIG. 7(C) (FIG. 7(C) shows a case in which data (FIG. 7A) B of packet data is broken) as interrupt data (FIG. 7B) is output from the output section 44. Therefore, the control section 48 has memory used as a stack. When interrupt data are input, field data output from the parallel-serial conversion section 42 as serial data are temporarily saved on the stack. The interrupt data FIG. 7B has interrupt start code (70) followed by interrupt data 72 and interrupt cancellation code 74. In FIG. 7C, X indicates the bits whereat data becomes invalid and is not used.

When input of interrupt data terminates, data saved on the stack are stored in the buffer 40 again, and saved data are output from the beginning in synchronization with the output of packet data before interrupt data are input. Thereby, as shown in FIG. 7(B), some bits of data output from the output section 44 become invalid, but the synchronization of communication between the primary- and secondary-side systems is maintained.

The interrupt detection section 58 of the receiving section 38 of the secondary-side system monitors whether four or more "0" bits occur successively in serial data sequentially input through the photoelectric transfer assembly 24. As mentioned above, the control section 48 of the transmitting section 36 performs control so that neither four or more "0" bits nor four or more "1" bits occur successively in packet data as a result of mirror reflection. Therefore, when four or more "0" bits occur successively, they are judged to be an interrupt start code. When the interrupt detection section 58 receives an interrupt start code, it notifies the control section 60 that an interrupt has occurred and fetches 6-bit data input after the interrupt start code to convert data into ARB-level data, and outputs data to the non-packet data processing section 32. When the interrupt detection section 58 receives an interrupt cancel code consisting of four consecutive "1" bits, it notifies the control section 60 that the interrupt has been canceled.

When the control section 60 receives notice of the occurrence of an interrupt, it detects a field in which data is corrupted because of the interrupt data, in order to discard the data in that field, and continues discarding the data until the interrupt is canceled. When the control section 60 receives notice of cancellation of the interrupt, it stops discarding data in synchronization with the timing of its previous reception of packet data, and once again starts outputting packet data to the packet data processing section 30.

When the non-packet data processing section 32 receives ARB-level data from the interrupt detection section 58, it instructs a CACP, not shown, to start bus arbitration, and changes the levels of the ARB1 to ARB4 lines of the microchannel bus 18 in accordance with the ARB level shown by the input ARB-level data. Thereby, bus arbitration is performed in the same way as described above. When the level of the ARB1 to ARB4 lines on termination of the arbitration is equal to their level before the arbitration started, the bus request source surviving bus arbitration in the primary-side system previously mentioned finally obtains the right to use the bus. When the level of the ARB1 to ARB4 lines on termination of the arbitration differs from the level before arbitration started, the bus request source surviving the present bus arbitration finally obtains the right to use the bus.

The non-packet data processing section 32 of the secondary-side system outputs the final ARB level to the interrupt sequencer 46. Thereby, in a way similar to that described above, the final ARB level is transmitted to the primary-side system as interrupt data and recognized by the primary- and secondary-side systems. As mentioned above, when the bus arbitration of one system terminates, ARB-level data are transmitted together with the interrupt start code and interrupt cancel code by asynchronously interrupting packet transmission. Therefore, it is possible to transmit ABR-level data to the secondary-side system much more quickly than when transmitting ABR-level data synchronously with packet transmission. Thus, bus arbitration terminates within the time specified in the Microchannel Bus standard, although no exclusive optical-fiber link for transmitting an ABR level is used.

The above description concerns a case involving the use of interrupt data showing an ABR level to which an interrupt start code is prefixed and to which an interrupt cancel code is suffixed. However, when the length of data showing an ABR level is constant, it is possible to omit the interrupt cancel code. The above-described process was realized by converting 4-bit data into 6-bit data, keeping a DC balance as shown in Table 1. However, the data length is not restricted to the above values, and may be adjusted as desired.

Moreover, the above description concerns a case involving the use of ABR-level data as data of the second type in the present invention. However, the present invention is not restricted to these data. Data related to processing in which a quick response is required, such as DMA or IRQ, are also included in data of the second type.

Furthermore, the above description concerns a case involving the use of an optical-fiber assembly 16 as a signal transmission line. However, the present invention is not restricted to such a line. It is also possible to use a general signal line for transmitting a signal when the voltage level changes.

Furthermore, the above description concerns a case involving the use of a microchannel bus 18 conforming to the Microchannel Bus standard. However, the present invention is not restricted to the bus 18. Needless to say, the present invention can be applied to the AT bus and other buses.

Furthermore, the above description concerns a case involving the use of a configuration in which the personal computer 12 and the extension box 14 are connected in a one-to-one correspondence. However, it is also possible to apply the present invention to a configuration in which another extension box 14 is connected to the above extension box 14.

Description of each signal line constituting the microchannel bus

Finally, those of the various signal lines constituting a microchannel bus that are used for the above embodiment are briefly described below. (For details, refer to the "*IBM Personal System/2 Hardware Interface Technical Reference.*")

—ADL line: This signal line is driven by a control master. A slave can easily latch a valid address and a status bit by the signal line. A signal in this signal line is used to enable a slave that includes a packet data processing section to latch an address from a bus.

—CD DS 16 line: This signal line is driven by a 16- or 32-bit memory and an I/O slave or DMA slave, which is used as a data port at an address in order to show whether a bus has 16 bits or 32 bits.

—S0 and —S1 lines: These signal lines define the type of bus cycle when bus cycles are started. When these signals are used together with the M/—IO line, the read/write operation in memory is distinguished from an I/O read/write operation.

—CMD line: This signal line is used to define when data become effective on a bus. The trailing edge of a signal in this signal line represents termination of a bus cycle.

CD CHRDY line: This signal line is normally active (ready), and is made inactive (nonready) to give to create more time when memory or an I/O slave terminates channel operation.

ARB1 to ARB4 lines: These signal lines constitute an arbitration bus. An arbitration participant outputting a bus request is allowed to change the states of an arbitration bus only immediately after the leading edge of the ARB/—GNT line. The ARB level of the arbitration participant with the highest priority is made valid on the arbitration bus when a certain time has passed since the start of arbitration. An arbitration participant whose bus request is permitted continuously drives of its own priority signal line.

ARB/—GNT line: The level of this signal line is changed by CACP. The signal is changed from low to high within a certain period after the —S0 line, —S1 line, —BURST line, and —CMD line have been made inactive, and bus arbitration is started. When bus arbitration terminates, the signal is made low, resulting in a positive determination of the bus request source that is permitted to use a microchannel bus or a DMA controller.

—PREEMPT line: This signal line is used when an arbitration participant (local arbiter) requests the use of a bus through arbitration. The local arbiter outputting a bus request makes the —PREEMPT line active and requests the start of bus arbitration. The local arbiter stops the operation for making the —PREEMPT line active when the use of a bus is permitted.

—IRQ3 to —IRQ7 lines, —IRQ9 to —IRQ12 lines, and —IRQ14 to —IRQ15 lines: These signal lines show that a unit has requested interrupt. When a slave makes one of the above signal lines low, an interrupt request is made.

—CHCK line: This signal line is used to indicate the occurrence of a fatal error preventing system operation from being continued.

CHRESET line: A system logic circuit drives this signal line in order to reset or initialize all adapters when the power supply is turned on or the voltage of a signal line drops.

—BURST line (for reference): This signal line is used to notify CACP that a microchannel bus is consecutively used for data block transfer. The bus user that performs data block transfer cancels the active state of the —BURST line at the last transfer cycle.

Operation

Regarding the method, data of the first kind that are to be transmitted from one to the other of a pair of systems are transmitted in accordance with a predetermined code system, and the converted data of the first kind are sequentially transmitted via a signal transmission path. When data of the second kind with higher priority than the converted data of the first kind must be transmitted during transmission of the converted data of the first kind, an interrupt code not defined by the code system is transmitted along with the data of the second kind via the signal transmission path by asynchronously interrupting transmission of the converted data of the first kind.

Because the interrupt code is not defined by the code system for converting data of the first kind, described above, it is judged at the receiving side that data of the first kind are received unless the interrupt code is included in the received data; as a result, data of the first kind can be fetched. When the interrupt code is included in the received data, it is judged that transmission of data of the first kind has been interrupted, and therefore the position of data of the second kind is decided in accordance with the position of the interrupt code, and data of the second kind can be fetched.

Therefore, because the present invention makes it possible to discriminate between data of the first and second kinds at the receiving side simply by asynchronously interrupting transmission of data of the first kind and transmitting data of the second kind with higher priority, data of the first and second kinds with different priorities can be smoothly transmitted via the same signal transmission path. Moreover, because data of the first and second kinds can be asynchronously transmitted, as described above, it is possible to transmit data of the second kind more rapidly to the receiving side that when data of the first and second kinds are synchronously transmitted.

The device includes, a first transmission means for converting data of the first kind that are to be transmitted in accordance with a predetermined code system and sequentially transmitting the converted data of the first kind via the signal transmission path, and a second transmission means for transmitting an interrupt code not defined by the code system, and data of the second kind with higher priority than data of the first kind, via the signal transmission path by asynchronously interrupting the transmission performed by the first transmission means as needed in order to transmit data of the second kind during transmission performed by the first transmission means, are connected to one end of the signal transmission path.

Moreover, a processing means is connected to the other end of the signal transmission path, and extracts data of the second kind transmitted together with the interrupt code in order to perform processing for data of the second kind when the interrupt code is included in the data received via the signal transmission path, and inverts data corresponding to data of the first kind converted by the first transmission means in the received data into data of the first kind in order to perform processing for the inverted data of the first kind.

Therefore, because the processing means discriminates between data of the first and second kinds similarly to the invention of claim 1, it is possible to smoothly transmit data of the first and second kinds with different priorities via the same signal transmission path. Thus, because the required number of signal transmission paths is less than when data of the first and second kinds are transmitted via different signal transmission paths, a plurality of systems can be coupled at low cost.

Advantages of the invention

As mentioned above, the invention of claim 1 has the strong advantage that a plurality of types of data with different priorities can be smoothly transmitted via the same signal transmission path because the data of the first kind which is to be transmitted from one to the other of a pair of systems are converted in accordance with a predetermined code system, the converted data of the first kind are transmitted sequentially via a signal transmission path, and an interrupt code not defined by the code system and data of the second kind with higher priority than the converted data of the first kind are transmitted via the signal transmission path by asynchronously interrupting the transmission of the converted data of the first kind as needed in order to transmit data of the second kind during the transmission of the converted data of the first kind.

The invention of claim 2 has another strong advantage in that a plurality of systems can be coupled at a low cost because the first transmission means for converting data of the first kind that are to be transmitted in accordance with a predetermined code system and transmitting the converted data of the first kind sequentially via a signal transmission path and a second transmission means for transmitting an interrupt code not defined by the code system and data of the second kind with higher priority than the data of the first kind via the signal transmission path by asynchronously interrupting transmission by the first transmission means when it is necessary to transmit data of the second, kind during transmission by the first transmission means are connected to one end of the signal transmission path, and a processing means for extracting data of the second kind transmitted together with the interrupt code when the interrupt code is included in the data received through the signal transmission path in order to perform processing in accordance with data of the second kind and inverts data corresponding to data of the first kind converted by the first transmission means in the received data into data of the first kind in order to perform processing in accordance with the inverted data of the first kind is connected to the other end of the signal transmission path.

While particular embodiments of the invention have been shown and described in detail, it will be obvious to those skilled in the art that changes and modifications can be made without departing from the spirit and scope of the invention.

What is claimed is:

1. A device for coupling a pair of computing systems comprising:

a single transmission path;

a first transmission means, connected to one end of the single transmission path, for converting data of a first kind which is to be transmitted in accordance with a predetermined code system and for sequentially transmitting the converted data of the first kind via the signal transmission path;

a second transmission means, connected to the one of the signal transmission path, for asynchronously interrupting transmission by the first transmission means as needed for transmitting an interrupt code not defined by the code system and data of a second kind with higher priority than data of the first kind and a processing means, connected to the other end of the signal transmission path, which extracts data of the second kind transmitted together with an interrupt code via the signal transmission path in order to perform processing in accordance with data of the second kind when the interrupt code is included in data received via the signal transmission path, and inverts data corresponding to data of the first kind converted by the first transmission means in the received data into data of the first kind in order to perform processing in accordance with the inverted data of the first kind.

2. The device according to claim 1, wherein the first transmission means is connected to a first bus attached to one of the pair of computing systems in order to transmit data showing the state of the first bus as data of the first or second kind, and a third transmission means, coupled to a second bus attached to the other of the computing systems, for changing the states of the second bus according to whether the data are of the first or second kind.

3. A data communication method for serially transmitting data from one to the other of at least a pair of computing systems connected via a signal transmission path, comprising the steps of:

(a) converting data of a first kind that are to be transmitted from one to the other of the computing systems in accordance with a predetermined code system;

(b) sequentially transmitting the converted data of the first kind via the signal transmission path;

(c) asynchronously interrupting transmission of the converted data of the first kind as needed; and (d) transmitting through said signal transmission path a first interrupt code not defined by the code system and data of a second kind with a different priority than the converted data of the first kind.

4. The data communication method of claim 3 wherein the different priority of the data in claim 3 is higher than the priority of the converted data.

5. The data communication method of claim 3 further including the steps of transmitting, through said signal transmission path, a second interrupt code at the end of the transmission of the data of the second kind; and resume transmitting the converted data of the first kind whose transmission had been halted to enable the transmission of the data of the second kind.

6. The data communication method of claim 5 wherein the first interrupt code and the second interrupt code are the same.

7. The data communication method of claim 5 wherein the first interrupt code and the second interrupt code are different.

8. The data communication method of claim 7 wherein the first interrupt code includes the binary bit pattern 0000 and the second interrupt code includes the binary bit pattern 1111.

9. In a computer system having a computer, an external box and a transmission link for coupling the computer to the external box an adapter card for mounting in the computer or the external box to processor information to be exchanged between the computer and the external box; said adapter card comprising:

a data conversion device for converting data of a first priority to be transmitted in accordance with a predetermined code system;

an output section coupled to the data conversion device, said output section receiving the converted data of the first kind and serially transmitting said converted data of the first kind;

an interrupt sequencer coupled to the output section said interrupt sequencer inserting into the serially transmitted converted data of the first kind, a first interrupt code not defined by the code system, data of a second priority and a second interrupt code not defined by the code system and different from the first interrupt code.

10. The adapter card of claim 9 further comprising:

a serial-to-parallel conversion section for receiving a serial stream of converted data of the first priority to generate parallel packets of data therefrom; and an interrupt detection section, coupled in parallel to the said parallel conversion section, for detecting the first interrupt code and for processing data concatenated to said first interrupt code until the second interrupt code is detected.

* * * * *